US009963970B2

(12) United States Patent
Lee et al.

(10) Patent No.: US 9,963,970 B2
(45) Date of Patent: May 8, 2018

(54) AXIAL FAN AND CONTROL METHOD THEREOF

(71) Applicant: DELTA ELECTRONICS, INC., Taoyuan Hsien (TW)

(72) Inventors: Chien-Ming Lee, Taoyuan Hsien (TW); Chia-Ming Hsu, Taoyuan Hsien (TW); Jung-Yuan Chen, Taoyuan Hsien (TW); Ching-Sen Hsieh, Taoyuan Hsien (TW); Jian-Cun Lin, Taoyuan Hsien (TW); Shih-Yu Lai, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 903 days.

(21) Appl. No.: 13/673,597

(22) Filed: Nov. 9, 2012

(65) Prior Publication Data

US 2013/0280029 A1     Oct. 24, 2013

(30) Foreign Application Priority Data

Apr. 20, 2012   (TW) .............................. 101114072 A (51) Int. Cl.
*F01D 5/00*      (2006.01)
*F01D 17/00*    (2006.01)
(Continued)

(52) U.S. Cl.
CPC .............. *F01D 5/00* (2013.01); *F01D 17/00* (2013.01); *F04D 17/16* (2013.01); *F04D 19/002* (2013.01);
(Continued)

(58) Field of Classification Search
CPC . F01D 5/00; F01D 17/00; F04D 17/16; F04D 27/004; F04D 25/0613; F04D 19/002; F04D 29/384
See application file for complete search history.

(56) References Cited

U.S. PATENT DOCUMENTS 3,168,235 A *   2/1965  Valdi ..................... F04D 29/384
                                                          415/220
6,565,334 B1 *  5/2003  Bradbury .............. F04D 29/384
                                                          361/695
(Continued)

FOREIGN PATENT DOCUMENTS

CN           1683840 A      10/2005
CN           1869451 A      11/2006
JP        2012-050284 A      3/2012

*Primary Examiner* — Aaron R Eastman
(74) *Attorney, Agent, or Firm* — Muncy, Geissler, Olds & Lowe, P.C.

(57) ABSTRACT

An axial fan includes a fan frame, an impeller and a motor. The fan frame has a frame body, a base and plural connecting members. The base is disposed at the center of a side of the frame body. The connecting members connect the frame body to the base. The impeller is accommodated in the frame body and disposed on the base. The impeller has a rotating shaft, a hub and plural blades disposed around the hub. The motor is disposed on the base and connects with the rotating shaft to drive the impeller to rotate. When the impeller rotates forwardly, the airflow is induced to flow through the connecting members, blades, and one side of the frame body away from the base. When the impeller rotates reversely, the airflow is induced to flow through the side of the frame body, blades and connecting members.

3 Claims, 10 Drawing Sheets

(51) Int. Cl.
*F04D 17/16* (2006.01)
*F04D 19/00* (2006.01)
*F04D 25/06* (2006.01)
*F04D 27/00* (2006.01)
*F04D 29/38* (2006.01)

(52) U.S. Cl.
CPC ....... *F04D 25/0613* (2013.01); *F04D 27/004* (2013.01); *F04D 29/384* (2013.01)

(56) References Cited

U.S. PATENT DOCUMENTS

| | | | |
|---|---|---|---|
| 8,647,077 B2 * | 2/2014 | Vinson | F04D 29/384 417/222.2 |
| 2006/0257251 A1 * | 11/2006 | Carlson | F04D 29/661 415/178 |
| 2007/0031248 A1 * | 2/2007 | Hsu | F04D 29/542 415/191 |
| 2008/0118379 A1 * | 5/2008 | Uchise | F04D 29/542 417/423.1 |
| 2008/0193287 A1 * | 8/2008 | Kobayashi | B29C 45/26 415/208.2 |
| 2008/0292453 A1 * | 11/2008 | Hsu | F04D 25/0613 415/182.1 |
| 2009/0035154 A1 * | 2/2009 | Hsu | F04D 29/54 417/244 |
| 2009/0060732 A1 * | 3/2009 | Hsu | F04D 25/0613 415/208.1 |
| 2009/0196744 A1 * | 8/2009 | Yu | F04D 25/082 415/177 |

* cited by examiner

AXIAL FAN AND CONTROL METHOD THEREOF

CROSS REFERENCE TO RELATED APPLICATIONS

This Non-provisional application claims priority under 35 U.S.C. § 119(a) on Patent Application No(s). 101114072 filed in Taiwan, Republic of China on Apr. 20, 2012, the entire contents of which are hereby incorporated by reference.

BACKGROUND OF THE INVENTION

Field of Invention

The invention relates to an axial flow fan and a control method thereof. In particularly, the invention relates to an axial flow fan with forward/reverse rotation characteristics, and a control method thereof.

Related Art

Figure 1A:
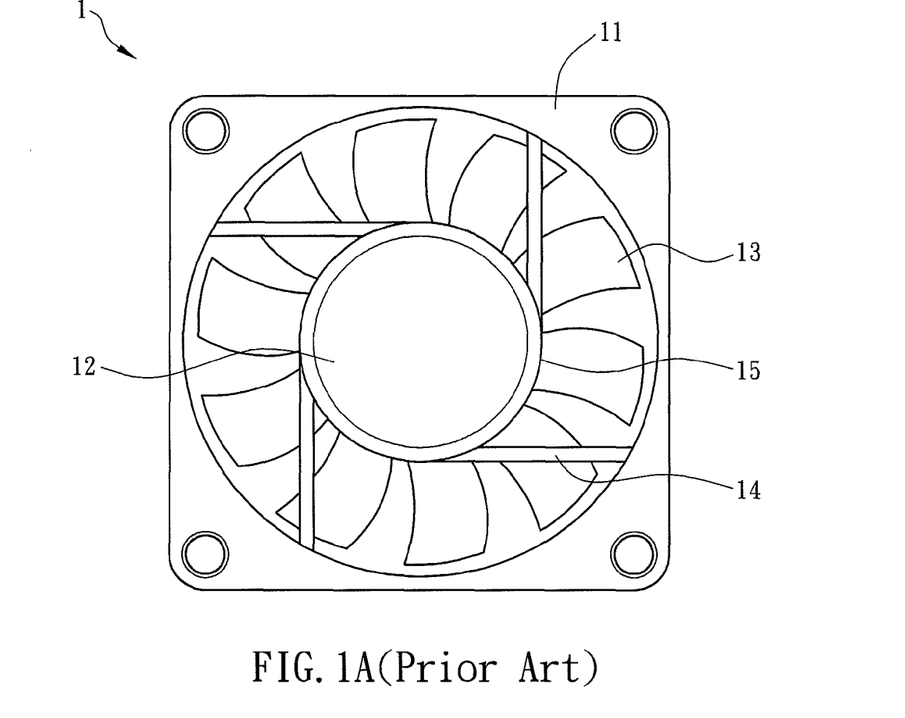
FIG. 1A is a top view of a conventional axial flow fan.
Figure 1B:
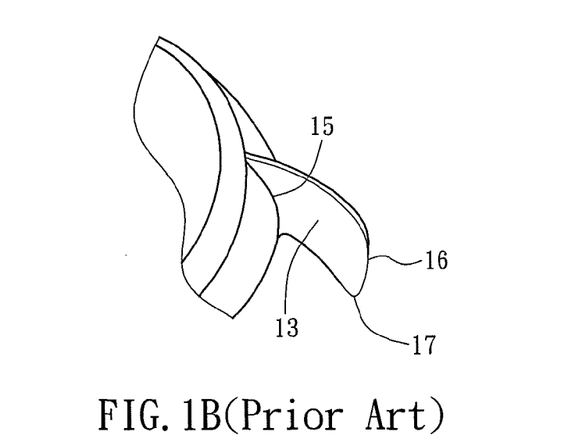
FIG. 1B is a schematic top view of the axial flow fan in FIG. 1A.

Currently axial flow fans are used for variety of purposes, such as the fan for cooling an electronic device and the outdoor unit for an air conditioner, and the effects of high efficiencies and low noises have been obtained through research and development with various techniques. Please refer to FIGS. 1A and 1B, wherein FIG. 1A is a top view of the base of a conventional axial flow fan 1, and FIG. 1B is a partially enlarged view of the hub 15 and one of the blades 13 in FIG. 1A viewing from the side of the axial flow fan 1 having connecting members 14. The axial flow fan 1 has a fan frame 11, a base 12, a plurality of blades 13, a plurality of connecting member 14, and a hub 15. The blades 13 have outer peripheral end 16 away from the hub 15, and the bottom of the outer peripheral end 16 has an end point 17.

Figure 2:
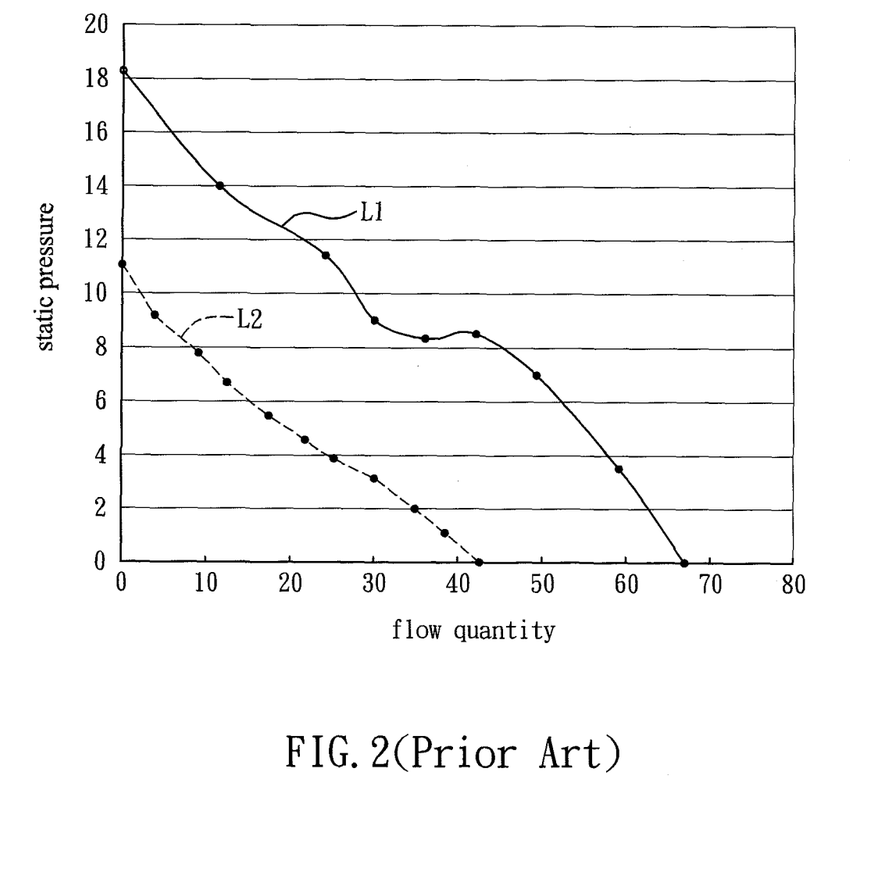
FIG. 2 is a graph showing the characteristics of forward and reverse rotations of the conventional axial flow fan.

FIG. 2 is a graph of the characteristics of the forward and reverse rotations of the axial flow fan 1. In FIG. 2, the horizontal axis represents the flow quantity of the axial flow fan in cubic feet per minute (CFM), and the vertical axis represents the static pressure of the axial flow fan in millimeter aqua (mmAq). From the graph of FIG. 2, it can be easily observed that the characteristic curve L1 of the axial flow fan 1 during forward rotations is quite different from the characteristic curve L2 during reverse rotation. Since the axial flow fans are mostly used under the status of rotating forwardly, the axial flow fans are designed with the consideration of optimizing the characteristics and efficiency of the forward rotations of the axial flow fan. Therefore, without considering the use of the axial flow fan for reverse rotations, the designs of the shapes of the blades 13 and the connecting members 14 of the conventional axial flow fan 1 (as shown in FIG. 1B) are focused on the presumption of using the axial flow fan for forward rotations, which results in that the characteristics of the forward rotations of the axial flow fan are better than the characteristics of the reverse rotations of the axial flow fan.

However, in different applications where it is necessary to make the characteristics of the forward rotations be close to the characteristics of the reverse rotations, the conventional axial flow fan is not suitable. For such applications the construction of the axial flow fan must be re-designed to consider the characteristics of both forward and reverse rotations. Therefore, it is an important subject to provide an axial flow fan with similar forward and reverse rotation characteristics and a control method thereof.

SUMMARY OF THE INVENTION

In view of the foregoing subject, an objective of the invention is to provide an axial flow fan and the control method thereof which can improve the characteristics of the axial flow fan during reverse rotation, and further to make the characteristics and efficiency of the axial flow fan during reverse rotations be approximate to the characteristics and efficiency of the axial flow fan during forward rotations.

To achieve the above objective, the present invention discloses an axial flow fan comprising a fan frame, an impeller and a motor. The fan frame has a frame body, a base and a plurality of connecting members. The base is disposed at a central portion of one side of the frame body, and the connecting members connect the frame body and the base. The impeller is accommodated in the frame body and disposed at the base. The impeller has a rotating shaft, a hub and a plurality of blades disposed around the outer periphery of the hub. The motor is disposed at the base and connected with the rotating shaft to drive the impeller to rotate. When the impeller rotates forwardly, an airflow is induced to flow through the connecting members, the blades, and one side of the frame body away from the base. When the impeller rotates reversely, the airflow is induced to flow through the side of the frame body away from the base, the blades, and the connecting members.

To achieve the above objective, the present invention also discloses a control method of an axial flow fan, comprising the steps of providing a pulse width modulation signal; calculating whether a duty cycle of the pulse width modulation signal is lasted for a period of time; and determining the duty cycle of the pulse width modulation signal when the duty cycle of the pulse width modulation signal is lasted for the period of time. When the duty cycle is in a first determining range, the axial flow fan is controlled to stop operating. When the duty cycle is in a second range, the axial flow fan is controlled to rotate forwardly. When the duty cycle is in a third range, the axial flow fan is controlled to rotate reversely.

As mentioned above, the axial flow fan of the invention is suitable for forward rotations and reverse rotations. When the impeller rotates forwardly, the impeller induces the airflow to flow through the connecting members of the fan frame first, and then after flowing through the blades, the airflow exits from the other side of the frame body relative to the base; when the impeller rotates reversely, the impeller induces the airflow to enter from another side of the frame body relative to the base, through the blades and the connecting members before exit. Moreover, the wing shape of the blades is designed together with the structure of the connecting member of the fan frame to improve the reverse rotation characteristics effectively. Furthermore, the method for controlling the axial flow fan of the invention controls the forward and reverse rotations of the axial flow fan by using the duty cycle of the pulse width modulation signals. Therefore, it is unnecessary to change the circuit architecture of the existing axial flow fan. The rotation direction or speed of the axial flow fan also can be freely changed easily according to practical needs without other control signals.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3A:
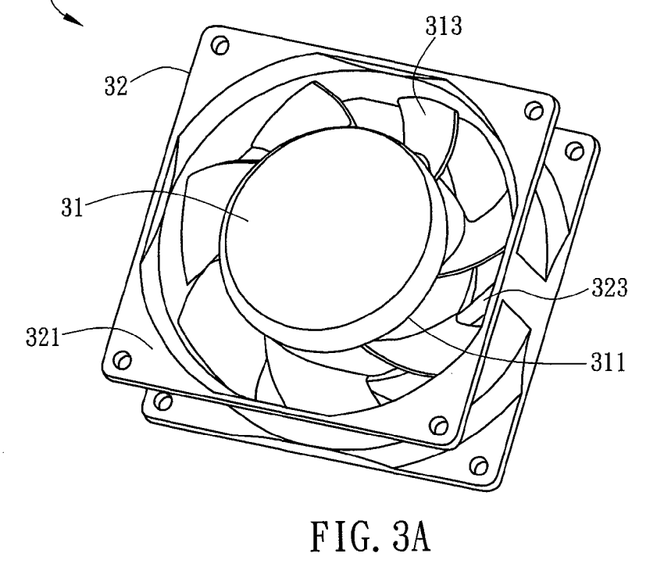
FIG. 3A is a schematic side view of the axial flow fan according to a preferred embodiment of the invention.
Figure 3B:
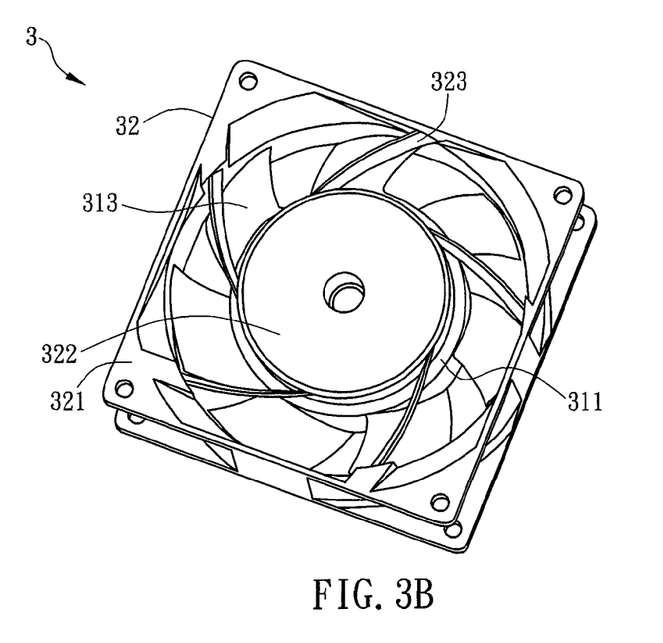
FIG. 3B is another schematic side view of the axial flow fan according to an embodiment of the invention.
Figure 3C:
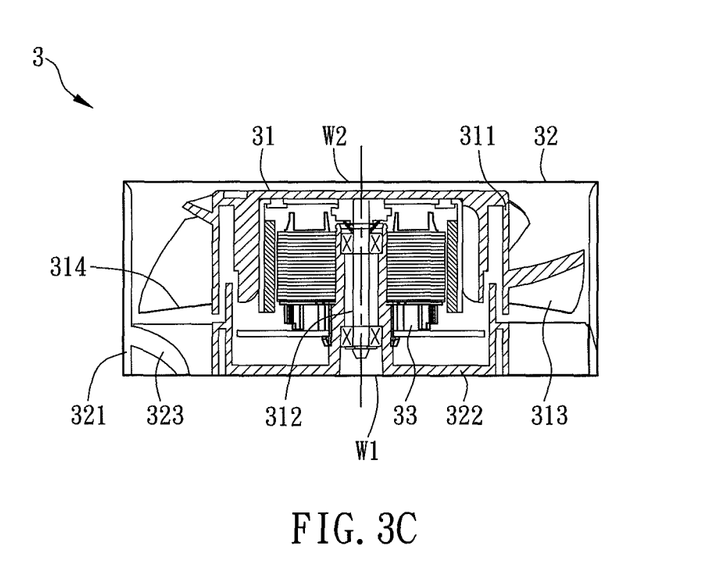
FIG. 3C is a sectional view of the axial flow fan according to FIG. 3A.

FIG. 3A is a schematic side view of an axial flow fan 3 according to a preferred embodiment of the invention, FIG. 3B is another schematic side view of the axial flow fan 3, and FIG. 3C is a sectional view of the axial flow fan 3 of FIG. 3A. Referring to FIGS. 3A to 3C, the axial flow fan 3 includes an impeller 31, a fan frame 32 and a motor 33. The impeller 31 and the motor 33 are accommodated in the fan frame 32. One side of the axial flow fan is the inlet side, while the relatively other side is the outlet side. Moreover, since the axial flow fan 3 of the embodiment is suitable for both forward and reverse rotations, a first side W1 of the axial flow fan is, for example, the inlet side during forward rotations and the outlet side during reverse rotations, while a relative second side W2 is, for example, the outlet side during forward rotations and the inlet side during reverse rotations. The airflows of forward and reverse rotations will be described hereinbelow.

The impeller 31 has a hub 311, a rotating shaft 312 and a plurality of blades 313. The rotating shaft 312 is coupled with the hub 311. The blades 313 are provided around the outer periphery of the hub 311 in intervals. The blades 313 have trailing edges 314.

The fan frame 32 has a frame body 321, a base 322, and a plurality of connecting members 323. The base is provided at the central portion of one side of the frame body 321. The connecting members 323 connect the frame body 321 and the base 322 respectively, and may be static blades or planar ribs. In the present embodiment, the connecting members 323 are static blades for example. The impeller 31 is accommodated in the frame body 321 and is disposed at the base 322. The trailing edges 314 of the blades 313 are near the connecting members 323.

The motor 33 is provided at the base 322 and is connected with the rotating shaft 312 to drive the impeller 31 to rotate. Since how to drive the impeller 31 to rotate by the motor 33 is well-known in the art, relevant descriptions are omitted here for concise purpose.

Figure 4A:
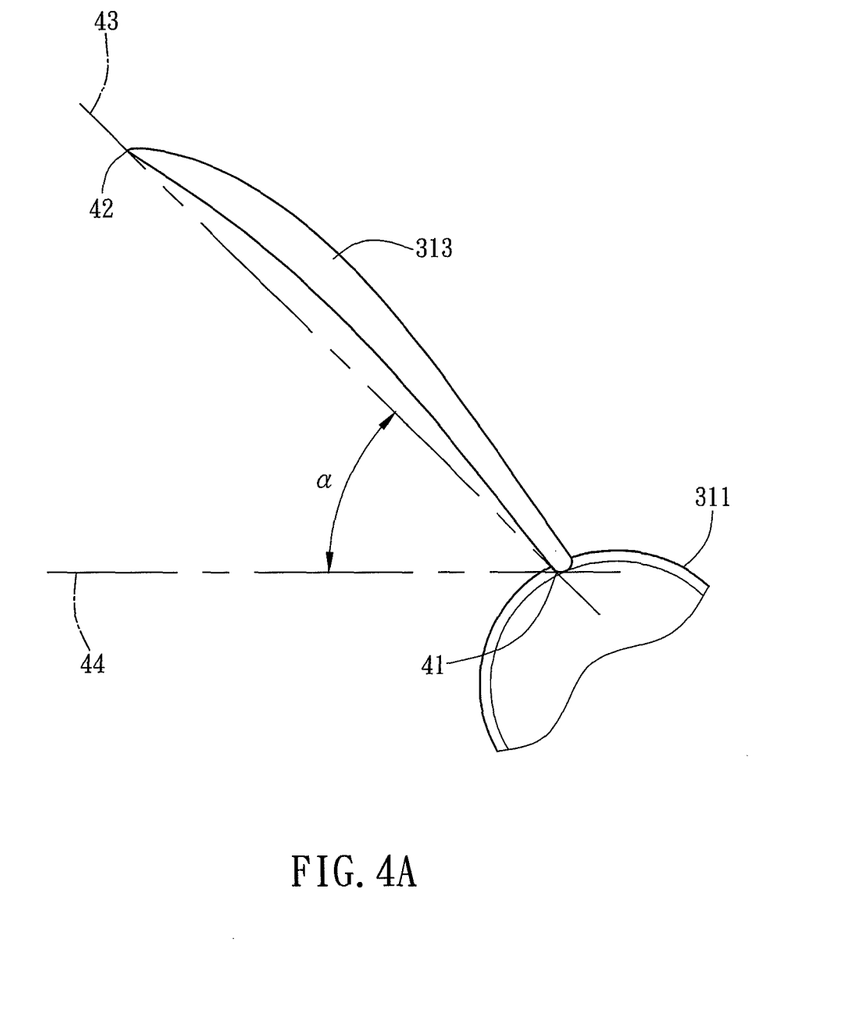
FIG. 4A and FIG. 4B are partially enlarged sectional views of the axial flow fan according to FIG. 3A.
Figure 4B:
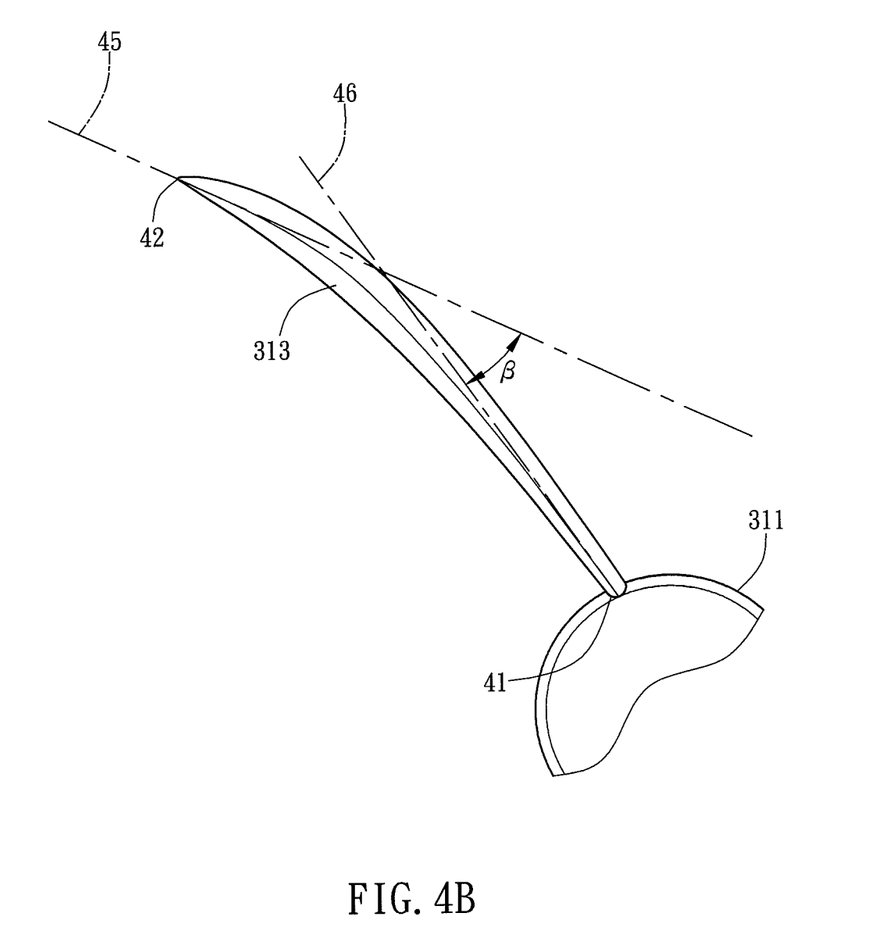

FIGS. 4A and 4B are partially enlarged views of the blade 313 and the hub 311 of the axial flow fan 3 according to FIG. 3A. As shown in FIG. 4A, each blade 313 has a hub end 41 and an edge end 42. The hub end 41 is the end the blade 313 connected with the hub 311, and the edge end 42 is the end the blade 313 away from the hub 311. A first chord line 43 connecting the hub 311 and the edge end 42 and a first horizontal line 44 being perpendicular to the rotating shaft 312 forms a first angle α. The range of the first angle α may be, for example, greater than or equal to 40 degrees and less than or equal to 50 degrees. By adjusting the degrees of the first angle α, the difference between the characteristics of forward and reverse rotations can be reduced. As shown in FIG. 4B, usually a first tangent line 45 tangent to the camber line passing through the edge end 42 and a second tangent line 46 tangent to the camber line passing through the hub end 41 forms a second angle β. The range of the second angle β may be, for example, less than 30 degrees. By lessening the degrees of the second angle β, the reverse rotation characteristics of the axial flow fan can be improved. In the present embodiment, the first angle α is the installation angle, and the second angle β is the camber angle.

Figure 5:
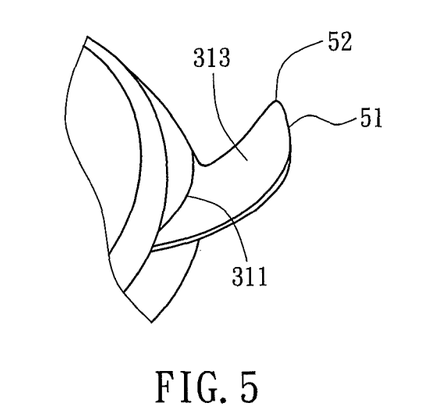
FIG. 5 is a schematic top view of the axial flow fan according to FIG. 3A.

FIG. 5 is a schematic top view of the axial flow fan 3 according to FIG. 3A, wherein the blade 313 and the hub 311 of the axial flow fan 3 are shown. Referring to FIG. 5, the blade 313 of the present embodiment further has an outer peripheral end 51 and an end point 52 away from the hub 311. Comparing FIG. 1B and FIG. 5, since the blade 313 is reversed (upside down), the end point 52 is located above the outer peripheral end 51. Such an aspect of the wing shape of the blade 313 is called a reverse blade design. In the present embodiment, by such a reverse blade design of the wing shape of the blade 313, together with the connecting member 323 of the outlet side of the fan frame 32, the reverse rotation characteristics of the axial flow fan is improved. Therefore the axial flow fan of the invention has equal forward rotation and reverse rotation characteristics.

Figure 6A:
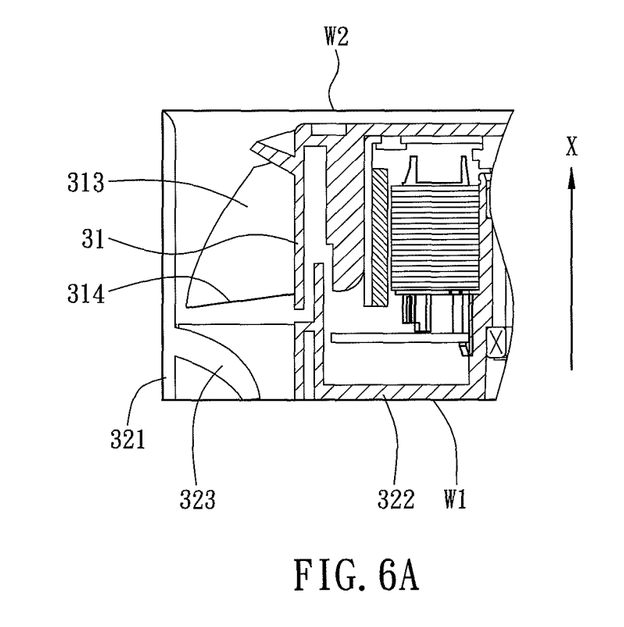
FIG. 6A and FIG. 6B are sectional side views of the axial flow fan according to FIG. 3A.
Figure 6B:
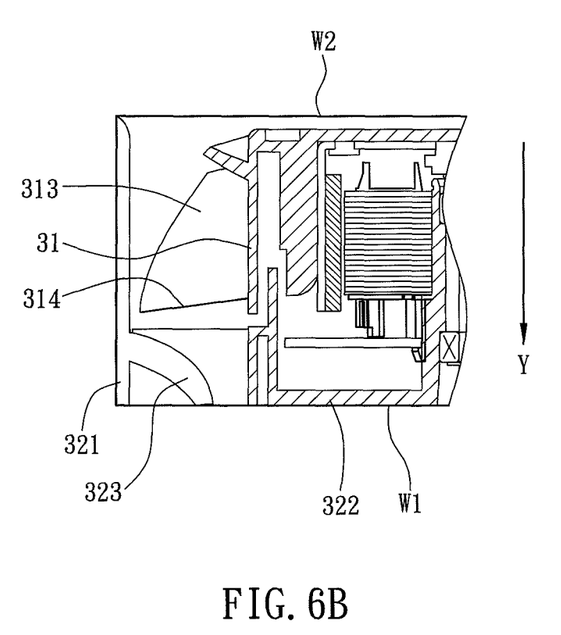

Please refer to FIG. 6A and FIG. 6B, which are schematic sectional side views showing the airflows of forward and reverse rotations of the axial flow fan 3 shown in FIG. 3A according to the preferred embodiment of the invention. When viewing from the top side of the axial flow fan 3 having the connecting members 323, in the present embodiment the impeller 31 rotates forwardly it rotates clockwise, and it rotates reversely if it rotates counter-clockwise. As shown in FIG. 6A, when the impeller 31 rotates forwardly, the impeller 31 induces the airflow to flow along a first direction X from the first side W1 through the connecting members 323 and the blades 313 to the second side W2 of the frame body 321 with respect to the base 322. Therefore, when the impeller 31 is operated to rotate forwardly, the first side W1 is the inlet side, and the second side is the outlet side. As shown in FIG. 6B, when the impeller 31 rotates reversely, the impeller 31 drives the air to flow along a second direction Y from the second side W2 of the frame body 321 with respect to the base 322 through the blades 313 first and then the connecting members 323 to the first side W1. Therefore, when the impeller 31 is operated to rotate reversely, the second side W2 is the inlet side, and the first side W1 is the outlet side.

Figure 7:
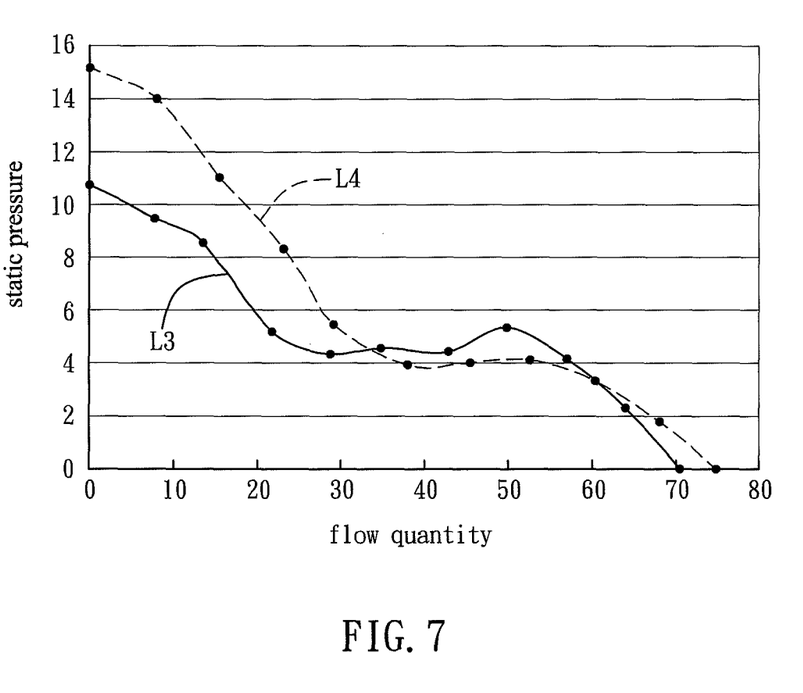
FIG. 7 is a graph showing the characteristics of forward and reverse rotations of the axial flow fan according to a preferred embodiment of the invention.

Please refer to FIG. 7, which is a graph showing the flow quantity—static pressure characteristic of the forward and reverse rotations of the axial flow fan 3 according to the preferred embodiment of the invention. The horizontal axis represents the flow quantity of the axial flow fan in cubic feet per minute (ft³/min), and the vertical axis represents the static pressure of the axial flow fan in millimeter aqua (mmAq). Referring to FIG. 7 and FIG. 2 simultaneously, it can be seen that the after the design improvement of the first angle (the installation angle) α and the second angle (the camber angle) β of the wing shape of the blades 313, the difference between the forward-rotation characteristic curve L3 and the reverse-rotation characteristic curve L4 of the axial flow fan 3 of the invention is small and is closer.

Figure 8:
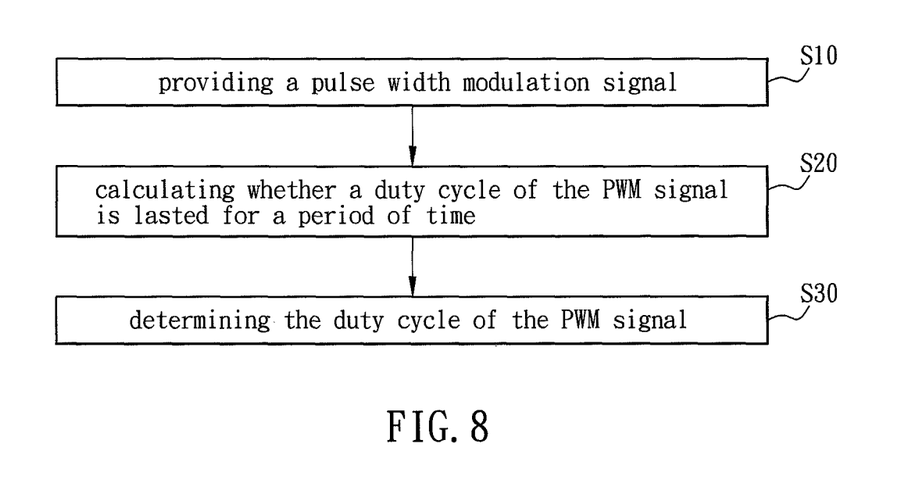
FIG. 8 is a flowchart of the control method of the axial flow fan according to a preferred embodiment of the invention.

FIG. 8 is a flowchart of the control method of the axial flow fan 3 according to a preferred embodiment of the invention. Referring to FIG. 8, the control method of the present embodiment is for controlling the axial flow fan 3 above. In details, the control method of the axial flow fan is to control the rotation direction and speed of the impeller 31. The control method of the present embodiment includes step S10, step S20 and step S30.

First, step S10 is to provide a pulse width modulation signal. It is noteworthy that before performing step S10, an input control signal is transformed into the pulse width modulation signal, wherein the input control signal is the control signal for controlling the rotation direction and speed of the impeller.

Step S20 is to calculate whether the duty cycle of the pulse width modulation signal is lasted for a period of time. For example, a micro-controller receives the pulse width modulation signal, and calculates whether the duty cycle of the pulse width modulation signal is lasted for a period of time, such as 5 seconds in the present embodiment without limiting sense. In other embodiments, the period of time may be 2 seconds or 3 seconds.

Afterwards, step S30 is to determine the duty cycle of the pulse width modulation signal. In details, when the pulse width modulation signal maintains a constant duty cycle and is lasted for more than a period of time, the duty cycle of the pulse width modulation signal is then determined. If the duty cycle of the pulse width modulation signal is in a first determining range, the axial flow fan is controlled to stop operating. The first determining range is between a first value and a second value, wherein the second value is greater than the first value. In the present embodiment if first value is for example 0%, the second value is for example 5% without limiting sense. Therefore, when the duty cycle of the pulse width modulation signal is 4%, it is determined that this duty cycle is in the first range, and the micro-controller controls the axial flow fan to stop operating.

Furthermore, if the duty cycle of the pulse width modulation signal is in a second determining range, the axial flow fan is controller to rotate forwardly. The second determining range is between a third value and a fourth value, wherein the fourth value is greater than the third value. In the present embodiment, the third value is for example 6%, and the fourth value is for example 10% without limiting sense. Therefore, when the duty cycle of the pulse width modulation signal is 9%, it is determined that this duty cycle is in the second determining range, and the micro-controller controls the axial flow fan to rotate forwardly.

Moreover, if the duty cycle of the pulse width modulation signal is in a third determining range, the axial flow fan is controller to rotate reversely. The third determining range is between a fifth value and a sixth value, wherein the sixth value is greater than the fifth value. In the present embodiment, the fifth value is for example 11%, and the sixth value is for example 15% without limiting sense. Therefore, when the duty cycle of the pulse width modulation signal is 14%, it is determined that this duty cycle is in the third determining range, and the micro-controller controls the axial flow fan to rotate reversely.

Moreover, when in the second determining range and the third determining range above for controlling the duty cycle of the forward and reverse rotations of the axial flow fan, the rotation speed of the axial flow fan can be controlled by inputting corresponding duty cycle according to practical needs. The corresponding duty cycle of the rotation speed of the present embodiment is between a seventh value and an eighth value, wherein the eighth value is greater than the seventh value. In the present embodiment, the seventh value is for example 16%, and the eighth value is for example 95% without limiting sense. The greater the value, the faster the corresponding rotation speed. In this case, when the duty cycle is between 96% and 100%, the rotation speed may be fixed at a fastest rotation speed. Furthermore, it might be possible not to control the rotation speed, and let the axial flow fan to rotate at a constant speed in the same direction.

If the duty cycle of the pulse width modulation signal is not within the three determining ranges above, for example between the second value and the third value, between the fourth value and the fifth value, or between the sixth value and the seventh value, the axial flow fan is set to rotate forwardly, wherein the third value is greater than the second value, the fifth value is greater than the fourth value, and the seventh value is greater than the sixth value. In the present embodiment, the second value is for example 5%, the third value is for example 6%, the fourth value is for example 10%, the fifth value is for example 11%, the sixth value is for example 15%, and the seventh value is for example 16% without limiting sense. Therefore, when the duty cycle of the pulse width modulation signal is 5.5%, 10.5% or 15.5%, it is determined that the duty cycle is not within the three determining ranges above, and the micro-controller controls the axial flow fan to rotate forwardly. The method of rotation speed control has been explained previously; therefore detailed descriptions are omitted here for concise purpose.

To sum up, the axial flow fan of the invention is suitable for forward rotations and reverse rotations. When the impeller rotates forwardly, the impeller induces the airflow to flow through the connecting members of the fan frame first, and then after flowing through the blades, the airflow exits from the other side of the frame body relative to the base; when the impeller rotates reversely, the impeller induces the airflow to enter from another side of the frame body relative to the base, through the blades and the connecting members before exit. Moreover, a first angle is formed between the straight line connecting the edge end and the hub end of the blade and the horizontal line perpendicular to the rotating shaft, and a second angle is formed between the tangent line of the edge end and the tangent line of the hub end. By adjusting the degree of the first angle to a range from 40 degrees to 50 degrees, and the second angle to equal to or less than 30 degrees, the reverse rotation characteristics of the axial flow fan can be close to the forward rotation characteristics. Moreover, the wing shape of the blades is designed together with the structure of the connecting member of the fan frame to improve the reverse rotation characteristics effectively. Furthermore, the method for controlling the axial flow fan of the invention controls the forward and reverse rotations of the axial flow fan by using the duty cycle of the pulse width modulation signals. Therefore, it is unnecessary to change the circuit architecture of the existing axial flow fan. The rotation direction or speed of the axial flow fan also can be freely changed easily according to practical needs without other control signals.

Although the present invention has been described with reference to specific embodiments, this description is not meant to be construed in a limiting sense. Various modifications of the disclosed embodiments, as well as alternative embodiments, will be apparent to persons skilled in the art.

It is, therefore, contemplated that the appended claims will cover all modifications that fall within the true scope of the present invention.

What is claimed is:

1. An axial flow fan, comprising:
    a fan frame having a frame body, a base and a plurality of connecting members, the base being disposed at a central portion of one side of the frame body, the connecting members connecting the frame body and the base;
    a single impeller accommodated in the frame body and disposed at the base, the single impeller having a rotating shaft, a hub and a plurality of blades disposed around the outer periphery of the hub, wherein each of the blades has a camber line, an edge end and a hub end, wherein a straight line connecting the edge end and the hub end and a projection line of each of the blades on a tangent plane of the rotating shaft form a stagger angle in a cross section from the hub end to the edge end of the blade, wherein a tangent line tangent to the camber line at the edge end and a tangent line tangent to the camber line at the hub end form a camber angle in the cross section from the hub end to the edge end of the blade; and
    a motor disposed at the base, the motor being connected with the rotating shaft to drive the single impeller switching between forward rotations and reverse rotations;
    wherein, when the single impeller rotates forwardly, an airflow is induced to flow through the connecting members, the blades, and one side of the frame body away from the base;
    when the single impeller rotates reversely, the airflow is induced to flow through the side of the frame body away from the base, the blades, and the connecting members,
    wherein in the cross section from the hub end to the edge end of the blade, the stagger angle is in a range of 40 degrees to 50 degrees and the camber angle is equal to or less than 30 degrees.

2. The axial flow fan according to claim 1, wherein the connecting members are static blades or planar ribs.

3. The axial flow fan according to claim 1, wherein a wing shape of the blades has a reverse blade design.

* * * * *